(12) United States Patent
Atherton et al.

(10) Patent No.: US 8,752,622 B2
(45) Date of Patent: Jun. 17, 2014

(54) DOWNHOLE TOOL FOR INVESTIGATING PERFORATIONS

(75) Inventors: Eric Atherton, Oxfordshire (GB); Tim Jones, Wakefield (GB)

(73) Assignee: Advanced Perforating Technologies Limited, Aberdeen (GB)

( * ) Notice: Subject to any disclaimer, the term of this patent is extended or adjusted under 35 U.S.C. 154(b) by 688 days.

(21) Appl. No.: 12/990,356

(22) PCT Filed: May 1, 2009

(86) PCT No.: PCT/GB2009/001108
§ 371 (c)(1),
(2), (4) Date: Jan. 6, 2011

(87) PCT Pub. No.: WO2009/133375
PCT Pub. Date: Nov. 5, 2009

(65) Prior Publication Data
US 2011/0094734 A1 Apr. 28, 2011

(30) Foreign Application Priority Data
May 1, 2008 (GB) .................................. 0807966.7

(51) Int. Cl.
*E21B 47/09* (2012.01)
(52) U.S. Cl.
USPC .......................................... 166/255.1; 166/66
(58) Field of Classification Search
USPC ............................... 166/255.1, 253.1, 66, 297
See application file for complete search history.

(56) References Cited

U.S. PATENT DOCUMENTS

| 3,934,468 | A | | 1/1976 | Brieger |
| 3,963,654 | A | | 6/1976 | Hutchison et al. |
| 4,149,409 | A | | 4/1979 | Serata |
| 4,461,171 | A | | 7/1984 | de la Cruz |
| 4,525,815 | A | | 6/1985 | Watson |
| 4,659,530 | A | | 4/1987 | Boyers et al. |
| 5,181,565 | A | * | 1/1993 | Czernichow ............... 166/66 |
| 5,207,104 | A | | 5/1993 | Enderlin |

(Continued)

FOREIGN PATENT DOCUMENTS

CN 2377350 Y 5/2000

OTHER PUBLICATIONS

PCT Search Report and Written Opinion; PCT/GB2009/001108; Jul. 4, 2011.
UK Search Report; GB0807966.7; Jul. 10, 2008.

*Primary Examiner* — William P Neuder
(74) *Attorney, Agent, or Firm* — Westman, Champlin & Koehler, P.A.; Z. Peter Sawicki

(57) ABSTRACT

To investigate the quality and nature of perforations in a downhole environment, a 'pecking' finger and depth measuring probe that can be axially and radially displaced enables the perforation to be located and its depth determined, through sequentially pecking around the wall lining. By swinging a pecking finger supporting a depth measuring probe tip and measuring the displacement of the finger, the edge and center of the hole can be determined with the largest displacement being when the tip is fully in the hole. The depth measuring probe is then deployed and the depth of the perforation established by an increase in the force required to push the probe and by the displacement of the pecking finger as it is pushed back by the reaction forces. Radially extendable clamps at the ends of the tool fix the tool with a surrounding bore.

19 Claims, 7 Drawing Sheets

(56) References Cited

U.S. PATENT DOCUMENTS

| | | | |
|---|---|---|---|
| 5,218,573 A | 6/1993 | Katahara | |
| 5,453,688 A * | 9/1995 | Cecco et al. | 324/220 |
| 6,766,854 B2 * | 7/2004 | Ciglenec et al. | 166/250.11 |
| 2006/0018190 A1 | 1/2006 | Brooks | |

\* cited by examiner

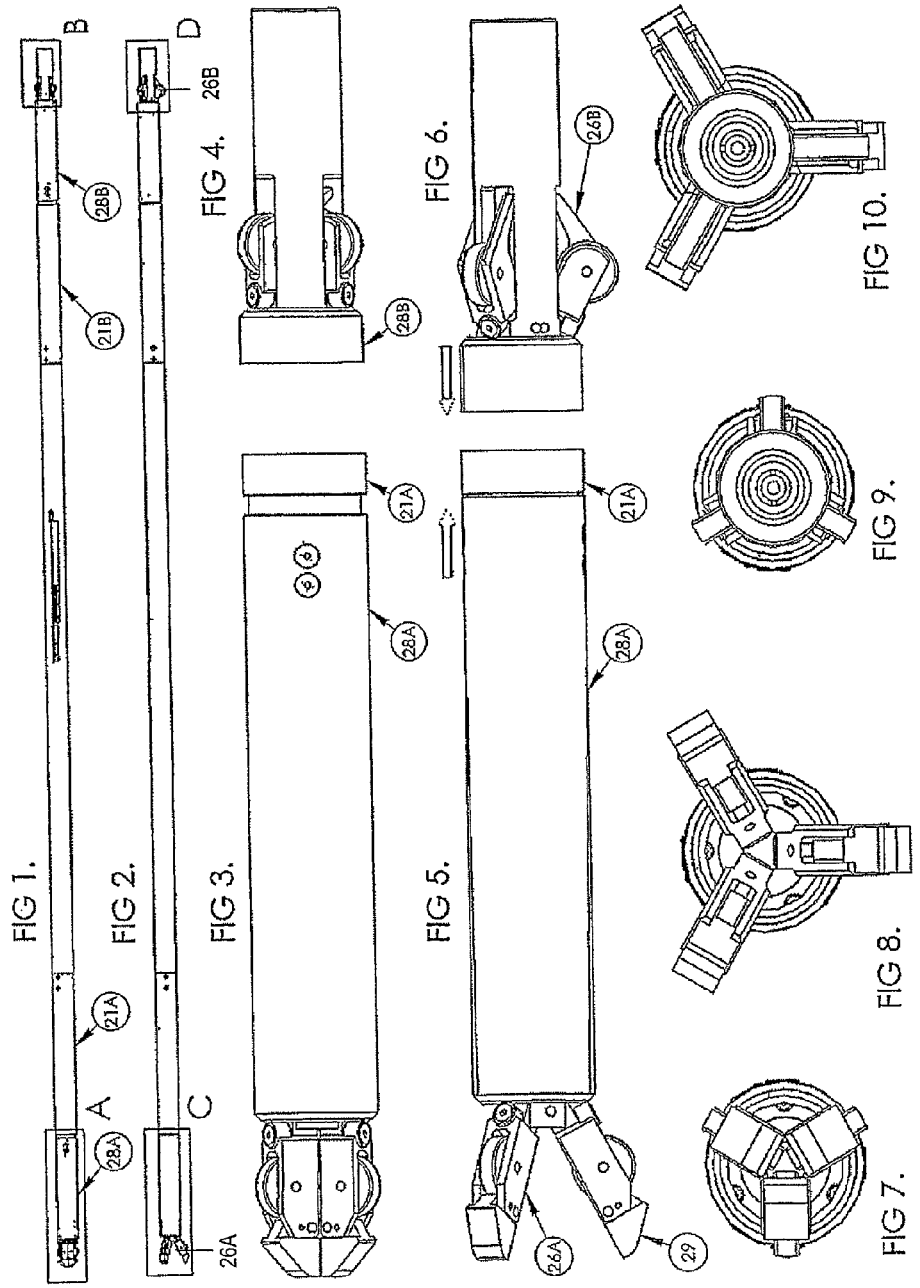

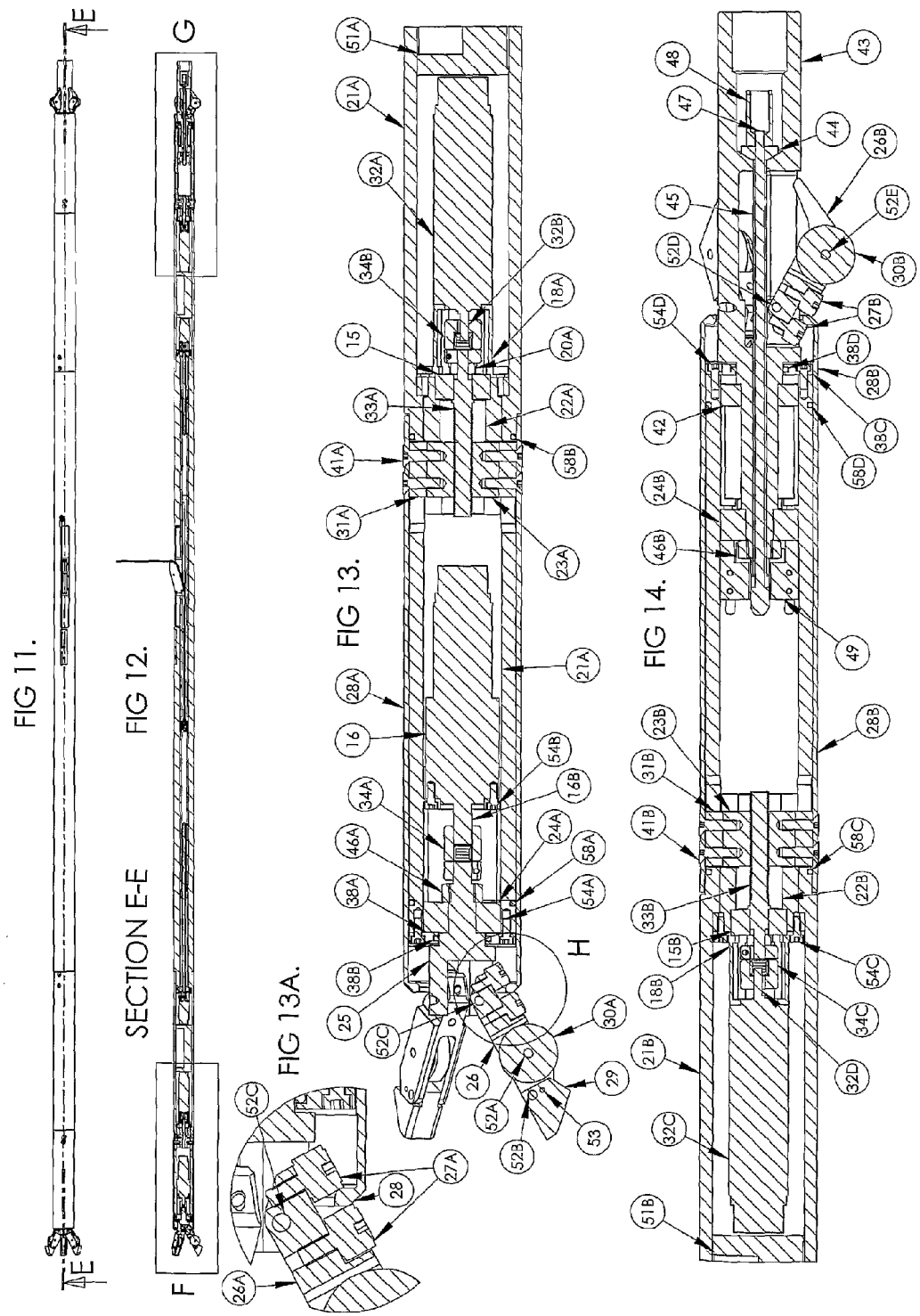

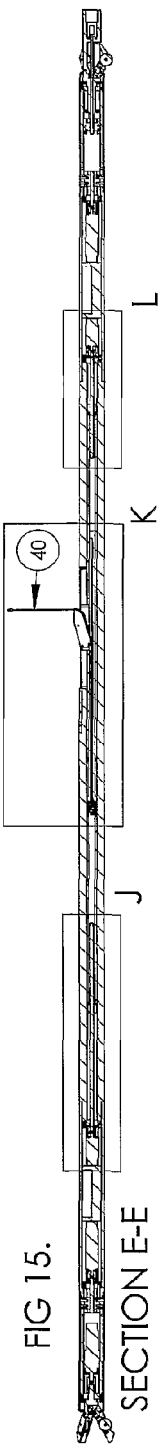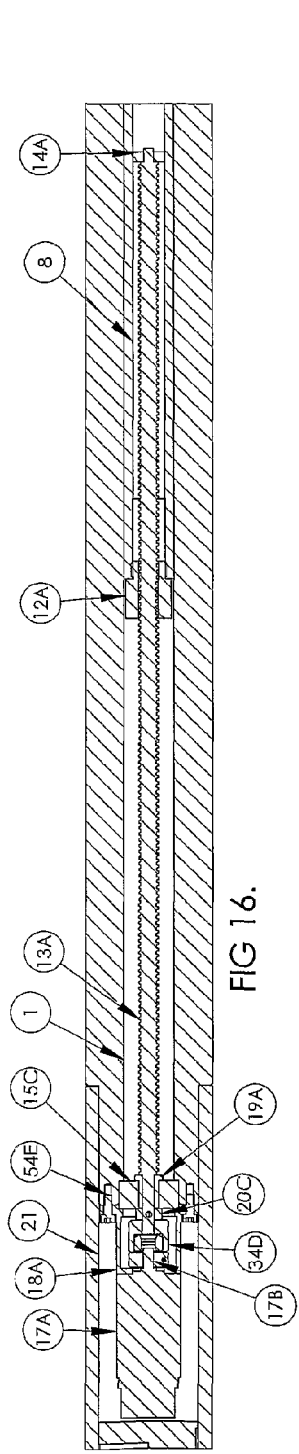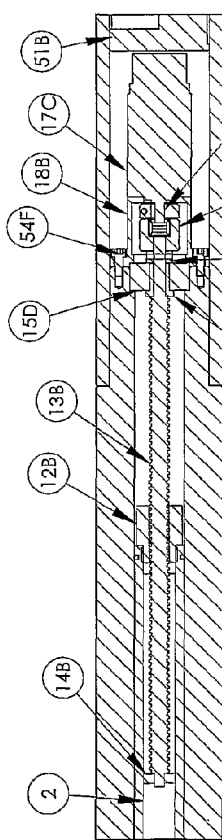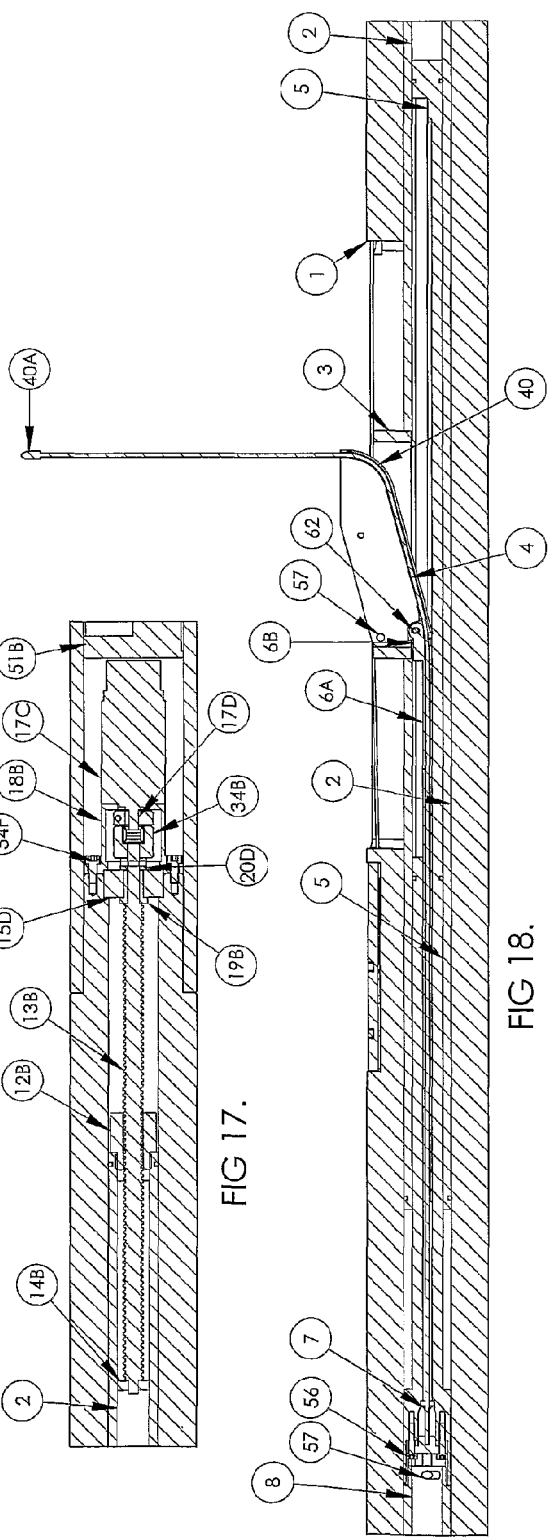

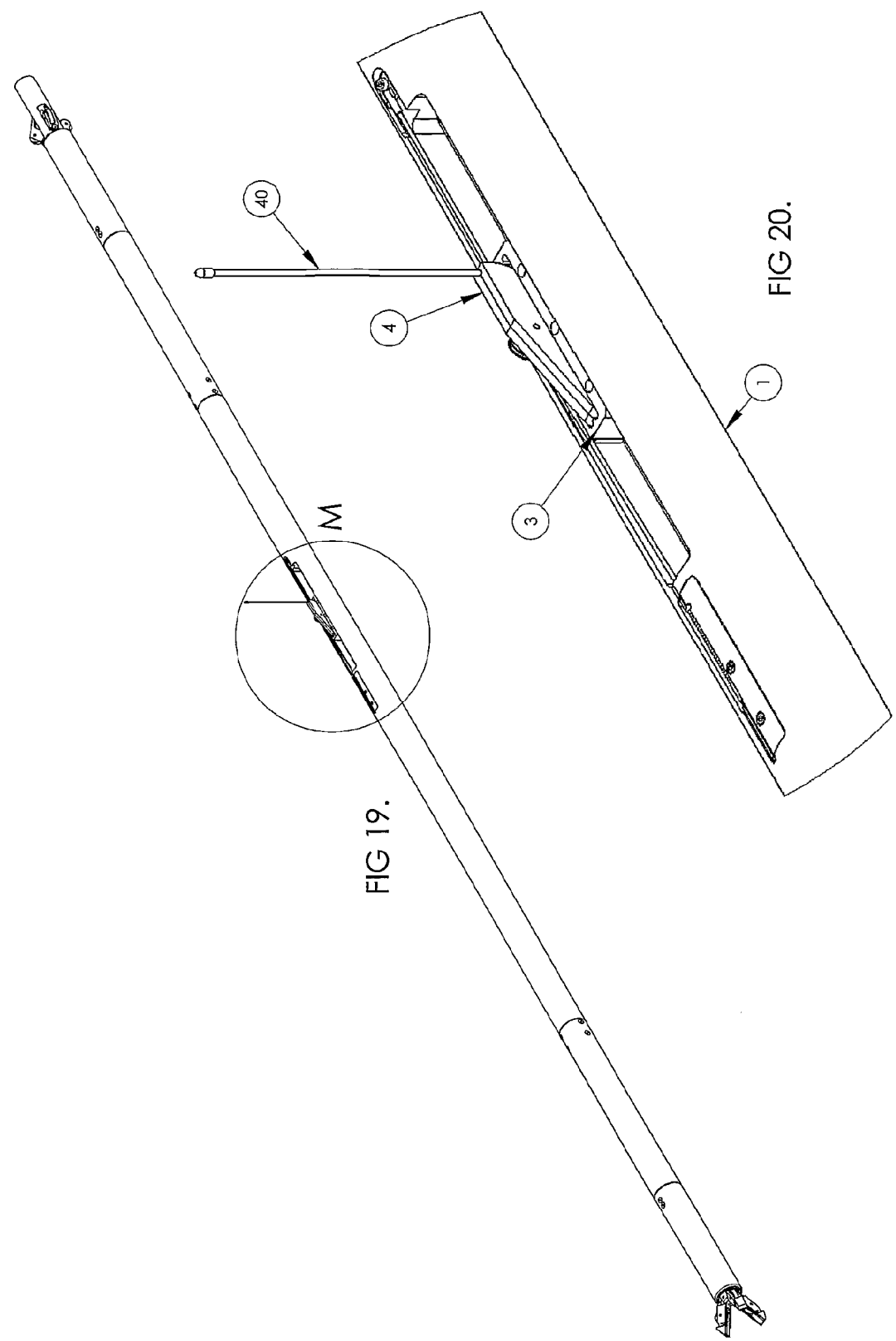

FIG 23. SECTION N-N

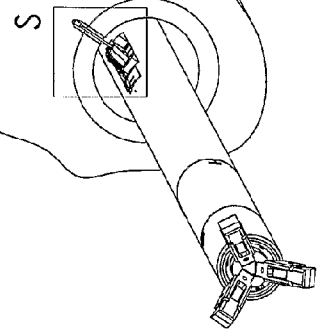
FIG 30.
R
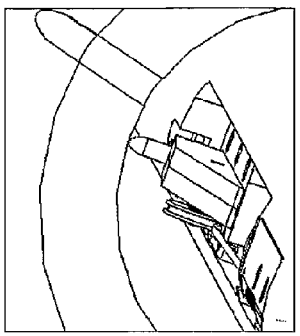
FIG 31.
DETAIL R
SCALE 1 : 1
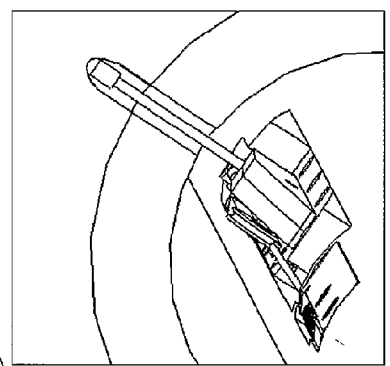
FIG 32.
S
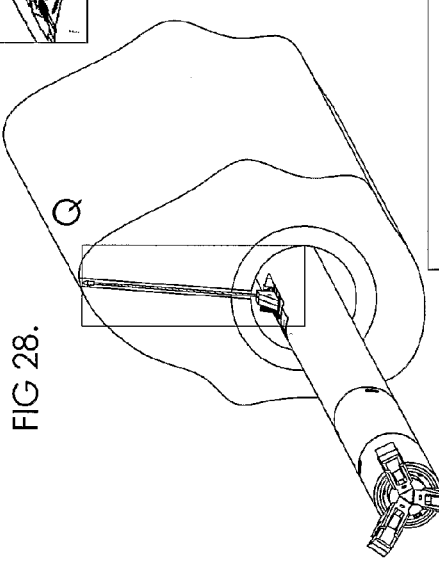
FIG 33.
DETAIL S
SCALE 1 : 1
FIG 28.
Q
FIG 29.
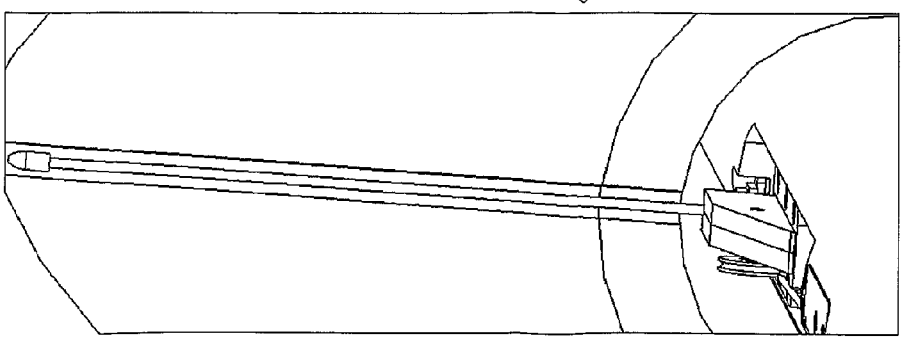
DETAIL Q
SCALE 1 : 1

DOWNHOLE TOOL FOR INVESTIGATING PERFORATIONS

CROSS-REFERENCE TO RELATED APPLICATION

The present application is a 371 National Stage Application of and claims priority of International patent application Serial No. PCT/GB2009/001108, filed May 1, 2009, and published in English the content of which is hereby incorporated by reference in its entirety.

FIELD OF THE INVENTION

The present invention relates to a downhole tool.

BACKGROUND ART

In the field of oil and gas exploration, it is usual to drill the well by first drilling the necessary hole, lining this with a steel liner, and backfilling behind the casing with cement. Prior to cementing the casing, drilling takes place under a fluid column of drilling mud. The hydrostatic pressure of the mud prevents flow of fluids from the downhole oil reservoir and/or aquifers into the well. Once the casing is cemented into place, the drilling mud is replaced by a lower density fluid, so that the hydrostatic pressure is less then the natural reservoir pressure. The casing can then be perforated adjacent to the oil producing zone, to allow the oil to flow into the well and to surface.

A perforating gun is used to perforate the well casing. The perforating gun is lowered down the oil well by a wire line to a predefined depth. It contains within it a series of explosive charges which, when detonated, fire projectiles or jets through the lining wail, thus creating orifices (perforations) through which the oil or gas can flow into the wellbore. Typically, a successful perforation will be of the order of 500 mm deep and 5 mm in diameter. Several perforations may be made, at a typical density of between 4 and 10 perforations per 300 mm.

From time to time, an attempt to create perforations is unsuccessful, in that it results in no flow or an inadequate flow. At present, there is no feasible way of investigating the quality of the perforations, so in such circumstances it will not be clear whether the poor flow is attributable to unsuccessful perforation (such as failure of the shaped charges) or to some external factor such as a lower than expected permeability of the rock around the hole.

SUMMARY OF THE INVENTION

Problems can therefore occur, typically with debris blocking these orifices which affects the well output. Where there is low yield from the well, this could be due either to the underlying nature of the oil reservoir, or due to problems with the perforations. There is a need therefore to be able to verify the quality of the perforations, principally to determine the orifice depth for a pre-defined minimum diameter.

The present invention seeks to provide a means of investigating the quality and/or nature of perforations in a downhole environment. Embodiments of the invention described in this patent application provide a tool that can assist in locating perforations and checking the perforation depth. Additionally, as the tool includes a mechanical probe to determine the perforation depth, it may also be possible to use it as a means to dislodge debris where present. The mechanical probe may also include a sensor, for measuring other parameters of the perforation hole, such as the surrounding rock resistivity, that can determine to what depth drilling mud filtrate has invaded the reservoir rock.

The invention therefore seeks to produce a tool which can be lowered to within close proximity of the well casing perforations that can be rigidly fixed and centralised to the well casing, and which has a 'pecking' finger and depth measuring probe that can be axially and radially displaced enabling the perforation to be located and its depth determined. There are well established techniques for positioning a down-hole tool to within a few inches of its intended location relative to the producing formation.

Having thus positioned the tool and locked it to the wall casing, embodiments of the invention allow the exact position of a perforation to be determined by techniques that include sequentially pecking around the wall lining in patterns such as radial, axial, and spiral sequences. By swinging a pecking finger that supports a depth measuring probe or cable with a bullet or conically shaped tip and measuring the displacement of the finger, the edge and centre of the hole can be determined with the largest displacement being when the tip is fully in the hole. When this position has been determined, the depth measuring cable is deployed and the depth of the perforation can be established by both an increase in the force required to push the cable and by the displacement of the pecking finger as it is pushed back by the reaction forces on the cable. Further details of the manner by which this can be achieved in preferred versions of the invention are described below.

Thus, in its first aspect the present inventions provides a downhole tool comprising a elongate housing for insertion into a downhole environment, from which a probe extends radially by a variable amount, means for driving the probe in a radial direction, and means for sensing resistance to outward radial movement of the probe.

The probe is preferably stored axially in the housing so that a sufficient length can be accommodated without the housing without needing to adopt excessive dimensions. It should be sized to fit within a perforation, and is preferably flexible so as to allow it to bend between a longitudinal and a radial disposition. It can extend from an axially rotateable part of the tool, such as a central section of the housing.

The probe is preferably moveable axially along the tool. To this end, it can be supported on a probe carriage that is moveable longitudinally within the housing such as by means of a lead screw. The probe can then extend through a probe guide shaped to bend the probe from a longitudinal direction within the housing to a radial direction external to the housing, also moveable longitudinally within the housing such as by means of a lead screw.

Resistance to further radial movement of the probe can be detected by applying a radially outward bias relative to the housing to the probe guide, and including a means for sensing movement of the guide against that bias. When the probe is unable to move radially further, an attempt to make it do so will cause the probe guide to recoil inwardly. Alternatively, or in addition, the torque applied by the motor driving the probe can be detected.

The probe can be made rotateable about the radial axis along which it extends, to assist in guiding it into a perforation and in clearing that perforation. Alternatively, or in addition, the probe can be made to proceed into the perforation in a reciprocating manner. In the latter case, the probe might withdraw slightly on reaching an obstruction before recommencing forward movement. This could be combined with a small rotational adjustment of the tool, and would assist in easing the probe into the full depth of a potentially irregular perforation.

One or more radially extendable clamps can be provided for fixing the tool within a surrounding bore. These can be at the upper and/or lower ends of the tool. Ideally, they are moveable between an extended and a retracted position by interengagement with a member moveable relative to a remainder of the tool in a direction that is longitudinal relative to the tool. The member can be, for example, a sleeve extending longitudinally around the tool, the sleeve being moveable longitudinally along the tool.

In a further aspect, the present invention relates to methods of investigating a downhole bore. A first method comprises the steps of providing a tool as defined above, locating the tool within the bore, driving the probe in a helical manner, whilst doing so, periodically extending the probe thereby to locate perforations in a wall of the bore. After locating a perforation, the probe can be extended into the perforation to ascertain the depth thereof. A second method allows for the detection of perforation sites via an alternative sensing method such as a suitable electrical sensor adapted to detect metal or the absence thereof. Once a perforation is detected, the probe of a tool as defined above is then extended into the perforation as before.

The clamps referred to above could be used to fix other types of tool in place in a downhole environment or one similar. Accordingly, in a still further aspect the present invention provides a downhole tool comprising an elongate housing for insertion into a downhole environment, at least one radially extendable clamp for fixing the tool within a surrounding bore, moveable between an extended and a retracted position by interengagement with a member moveable relative to a remainder of the tool in a direction that is longitudinal relative to the tool. As before, the member can be a sleeve extending longitudinally around the tool, the sleeve being moveable longitudinally along the tool and such clamps can be provided at an upper and/or a lower end of the tool.

BRIEF DESCRIPTION OF THE DRAWINGS

An embodiment of the present invention will now be described by way of example, with reference to the accompanying figures in which;

FIG. 1 shows a top elevation of the tool in its compact form as it would be lowered into the oil well string.

FIG. 2 shows a side elevation of the tool with the centralising fingers 26A and 26B at either end of the tool deployed.

FIG. 3 shows a detailed view of the left hand end of the tool within rectangle A of FIG. 1.

FIG. 4 shows a detailed view of the right hand end of the tool within rectangle B of FIG. 1.

FIG. 5 shows a detailed view of the left hand end of the tool within rectangle C of FIG. 2

FIG. 6 shows a detailed view of the right hand end of the tool within rectangle D of FIG. 2.

FIG. 7 shows an end elevation of FIG. 1 as viewed from the left.

FIG. 8 shows an end elevation of FIG. 2 as viewed from the left.

FIG. 9 shows an end elevation of FIG. 1 as viewed from the right.

FIG. 10 shows an end elevation of FIG. 2 as viewed from the right.

FIG. 11 shows a top elevation of the tool with the centralising fingers deployed and with the depth measuring probe 40 deployed.

FIG. 12 shows a section E-E through FIG. 11.

FIG. 13 shows a detail of section E-E as contained by rectangle F in FIG. 12.

FIG. 13A shows a close up detail of FIG. 13 as contained by circle H.

FIG. 14 shows a detail of section E-E as contained by rectangle G in FIG. 12.

FIG. 15 shows a section E-E through FIG. 11 with detail rectangles J, K and L.

FIG. 16 shows a detail of section E-E as contained by rectangle J in FIG. 15.

FIG. 17 shows a detail of section E-E as contained by rectangle L in FIG. 15.

FIG. 18 shows a detail of section E-E as contained by rectangle K in FIG. 15.

FIG. 19 shows an isometric view of the tool with the centralising fingers deployed and with the depth measuring probe 40 deployed with carriage 3 half way along its linear traverse in main body 1.

FIG. 23 shows partial section N-N of FIG. 21.

FIG. 28 shows the depth measuring probe fully deployed into a perforation.

FIG. 29 shows the detail contained within rectangle Q of FIG. 28.

FIG. 30 shows the depth measuring probe tip in contact with the wall lining as part of the hole location pecking sequence (described later in this patent application).

FIG. 31 shows the detail contained within rectangle R of FIG. 30.

FIG. 32 shows the depth measuring probe tip in a restricted perforation.

FIG. 33 shows the detail contained within rectangle S of FIG. 32.

DETAILED DESCRIPTION OF THE EMBODIMENTS

Figures 21, 22:
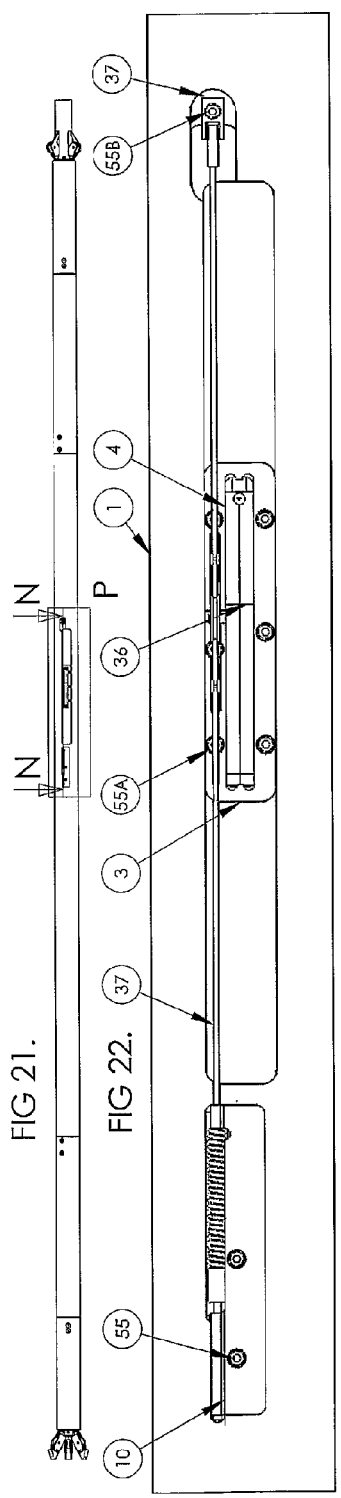
FIG. 21 shows a top elevation of the tool with the centralising fingers deployed and with the depth measuring probe 40 deployed with detail rectangle P and section N-N.
FIG. 22 shows the detail contained within rectangle P of FIG. 21.
Figure 24:
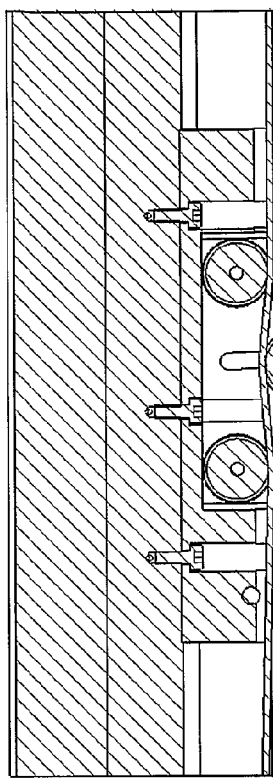
FIGS. 24-27 show the central detail of section N-N with pecker 4 and cable 40 in varying states of deployment.

FIG. 1 shows the tool in its compact form as it would be lowered into the oil well string. The right hand end of the tool has a screw attachment enabling it to be attached to an e-line, i.e. a braided wire line with a built in signal wire for functions such as the supply of electrical power to the device, the receipt of status and positional information from the device to the surface, and the electrical control of the device from the surface. The powering and control of downhole electrical tools from surface equipment through a wireline cable being well known to those skilled in the art.

FIG. 2 shows a side elevation of the tool with the centralising fingers 26A and 266 at either end of the tool in a deployed position. These fingers act so as to centralise the main body of the tool with respect to the oil well lining, with the fingertips 29 firmly gripping the lining wall to provide an axial and radial datum position for the tool.

FIGS. 7 and 9 show end views of the tool with the fingers 26A, 26B retracted as shown in FIG. 1, and FIGS. 3 and 4 show side views of the lower and upper ends (respectively) of the tool in the same state. It can be seen that with the fingers retracted, the tool has a minimal exterior profile that is suitable for lowering into a typical well.

FIGS. 8 and 10, and FIGS. 5 and 6, show views corresponding to FIGS. 7, 9, 3 and 4 respectively with the fingers 26A, 26B extended. With the tool within a well, these fingers will impinge on the interior walls of the well, allowing the tool to be fixed relative to the well.

FIG. 13 shows how the main body of the tool is rotated axially relative to the bore. A motor, gearbox and encoder assembly 16 is fixed by screws 54B to support tube 21A. The output shaft 16B drives finger support shaft 25 via coupling 34A. Fingers 26A are linked to finger support shaft 25 by pins 52C. Finger support shaft 25 is supported by ball bearing 24A which is held in place by retaining nut 46A. Clamp plate 38A retains ball bearing 24A to support tube 21A. By this means and by using appropriate control electronics 51A, the angular position and speed of finger support shaft 25 and fingers 26A relative to support tube 21A can be controlled. When the fingers 26A are deployed, locking these fingers to the wall lining using fingertips 29, then rotation of motor/gearbox/encoder assembly 16 causes rotation of support tube 21A relative to the wall lining. Cabling from the electronics module 51A to motor/gearbox/encoder assembly 16 is not shown for clarity of illustration.

FIG. 13 also shows how the fingers 26A are deployed and retracted. A further motor, gearbox and encoder assembly 32A is clamped to motor support tube 18A with screws (not shown). This is in turn fastened to block 22A clamping bearing 15A in place. Lead-screw 33A is retained to bearing 15 with retaining clamp 20A. Lead-screw 33A is screwed into lead-screw nut-block 23A which is clamped to a finger deployment tube 28A using screws 41A through spacers 31A. Gearbox shaft 32B is clamped to lead-screw 33A via coupling 34B. Rotation of the gearbox shaft 32B will therefore cause linear displacement of lead-screw nut block 23A, which in turn causes linear displacement of finger deployment tube 28A. In FIGS. 13 and 13A, it can be seen that fingers 26A have cam-followers 27A attached which bear on annular feature 28 of finger deployment tube 28A. Axial displacement of finger deployment tube 28A thus causes angular rotation of fingers 26A about pins 52C. By this means, and by using appropriate control electronics 51A, the linear position and speed of finger deployment tube 28A and thereby the angular position and speed of fingers 26A can be controlled. By controlling the torque of motor 32A, the clamping force of fingertips 29 against the lining wall can also be controlled. The use of cam followers 27A allows rotation of central support 1 without undue friction occurring, even with large clamping forces between fingertips 29 and the well lining.

Fingertips 29 are fastened to fingers 26A by pins 52B and 53. Should there be a failure of the finger deployment motor or its control electronics whilst the fingers 26A are deployed, pins 53 are designed to shear when tension is applied to the e-line cable, allowing the tool to be extracted. Rollers 30A supported on pins 52A fixed to fingers 26A will ease the removal of the tool.

Similarly, FIG. 14 shows a motor/gearbox/encoder assembly 32C at the upper end of the tool, that is clamped to motor support tube 18B with screws (not shown). This is in turn fastened to block 22B clamping bearing 15B in place. Lead-screw 33B is retained to bearing 15B with retaining clamp 20B. Lead-screw 33B is screwed into lead-screw nut-block 23B, which is clamped to finger deployment tube 28B using screws 41B through spacers 31B. Gearbox shaft 32D is clamped to lead-screw 33B via coupling 34C. Rotation of gearbox shaft 32D causes linear displacement of lead-screw nut block 23B which in turn causes linear displacement of finger deployment tube 28B. It can be seen that fingers 26B have cam-followers 27B attached, which bear on an annular feature of finger deployment tube 28B. Axial displacement of finger deployment tube 28B causes angular rotation of fingers 26B about pins 52D. By this means, and by using appropriate control electronics 51B, the linear position and speed of finger deployment tube 28B and thereby angular position and speed of fingers 26B can be controlled.

Rollers 30B are also fastened to fingers 26B via pins 52E. By controlling the torque of motor 32C, the clamping force of fingertips rollers 30B against the lining wall can also be controlled. The use of cam followers 27B allows rotation of central support 1 without undue friction occurring even with large clamping forces between rollers 30B and the well lining. Should there be a failure of the finger deployment motor or its control electronics whilst the fingers 26B are deployed, rollers 30B will ease the removal of the tool. Fingers 26B are also shaped to ease the transition over edges by presenting a shallow angle to the tool axis.

We will now describe the control of the perforation sensor with reference to FIG. 16 onwards. FIG. 15 shows the location along the tool of the sections shown in detail in FIGS. 16 to 18.

In FIG. 16, a motor encoder assembly 17A is clamped to motor support 18A with screws (not shown). This is clamped in turn to central support 1 with screws 54E clamping ball bearing 15C in place. Ball-screw spindle 13A is clamped to ball bearing 15C with clamps 19A and 20C. Motor shaft 17B is clamped to ball-screw spindle 13A via coupling 34D. Ball-screw nut 12A is fastened to cable drive tube 8 and the end of ball-screw spindle 13A is supported by bearing 14A which is free to slide in cable drive tube 8. By this means and by using appropriate control electronics 51A, rotation of motor shaft 17B causes linear displacement of cable drive tube 8.

Similarly in FIG. 17 motor encoder assembly 17C is clamped to motor support 18B with screws (not shown). This is clamped in turn to central support 1 with screws 54F clamping ball bearing 15D in place. Ball-screw spindle 13B is clamped to ball bearing 15D with clamps 19B and 20D. Motor shaft 17D is clamped to ball-screw spindle 13B via coupling 34E. Ball-screw nut 12B is fastened to carriage drive tube 2, and the end of ball-screw spindle 13b is supported by bearing 14b which is free to slide in carriage drive tube 2. By this means and by using appropriate control electronics 51B, rotation of motor shaft 17D causes linear displacement of carriage drive tube 2.

Thus, the cable drive tube 8 and the carriage drive tube 2 can each be moved longitudinally as desired.

In FIG. 18, cable drive tube 8 is fastened to cable support outer tube 5 by pin 57. Tapered cable clamp 7 is fastened to cable support outer tube 5 by screws 56, which when tightened grip cable 40 by virtue of the taper surfaces between tapered cable clamp 7 and the cable support outer tube 5. Cable support outer tube 5 has an aperture which allows relative motion to occur between cable support outer tube 5 and pecker finger 4 without obstruction. By this means linear motion of cable drive tube 8 causes linear motion of cable 40 and depth measuring probe tip 40A. The direction of cable 40 is controlled by a curved aperture in pecker 4, pecker 4 being machined as two mirrored halves allowing such an aperture to be created. As the cable 40 is being pushed to determine perforation depth, the cable is prone to buckling. In order to prevent this, a cable support inner tube 6 fastened to pecker 4 by pin 62 is provided which telescopes inside cable support outer tube, thus minimising buckling clearance. By this means cable 40 can be axially displaced with respect to central support 1, limited by the length of the aperture machined into cable support tube outer tube 5, with this axial displacement being translated into a radial displacement by curved aperture in pecker 4, directly related to the rotation of motor shaft 17B as controlled by control electronics 51A.

Also in FIG. 18, Carriage block 3 is fastened to carriage drive tube 2 by screws 55A (see FIG. 22). Pecker finger 4 is fastened to carriage block 3 by pin 57 about which it is free to rotate. By this means carriage block 3 can be linearly positioned with respect to central support 1, limited by the length of the aperture machined into central support 1, by the rotation of motor shaft 17D as controlled by control electronics 51B.

It can be seen that linear translation of carriage drive tube 2 combined with an equal linear translation of cable drive tube 8 results in linear translation of carriage block 3, with no relative radial motion of depth measuring probe tip 40A with respect to carriage block 3. A linear translation of cable drive tube 8 on its own (i.e. whilst the carriage drive tube 2 remains stationary) causes radial translation of depth measuring probe tip 40A. A linear translation of both, but at different speeds and/or in a different direction will cause a combination of linear translation of carriage block 3 and radial translation of depth measuring probe tip 40A. It can be seen that when depth measuring probe tip 40A is retracted such that it comes into contact with pecker 4, then pecker 4 will be rotated about pin 57 retracting pecker 4 into carriage block 3.

It should be appreciated that this invention is intended to operate in a highly pressurised fluid filled environment, and therefore any mechanism that projects into this fluid is subject to these large pressures. It is for this reason that carriage drive tube 2 extends beyond the left hand edge of the aperture in central support 1, having an equal diameter at both ends. Seals 2A and 2B at either end of carriage drive tube 2 result in no net torque being applied to motor/encoder assembly 17C through ball nut 12B and ball-screw spindle 13B due to hydraulic force on carriage drive tube 2. Similarly, cable drive tube 5 extends into carriage drive tube 2 beyond the aperture in carriage drive tube 2 with seals 5A and 5B either side just beyond the aperture in cable drive tube 5. Cable support inner tube 6A is unsealed allowing fluid to easily pass through it so that regardless of the position of carriage drive tube 2 and cable drive tube 5, there is no hydraulic volume change resulting in a hydraulically balanced design. Consequentially, there is no net torque being applied to motor/encoder assembly 17A through ball nut 12A and ball-screw spindle 13A due to hydraulic force on cable drive tube 5. It can be also seen in FIGS. 13 and 14 that finger deployment tubes 28A and 28B have a common sealing diameter for seals 58A, 58B, 58C and 58D so there are no net hydraulic forces on finger deployment tubes 28A and 28B.

FIGS. 19 and 20 provide isometric views of FIG. 18 for clarity.

FIGS. 22 and 23 show plan and sectional detail views of pecker 4 and its measurement system, in the region of the tool indicated by detail P in FIG. 21. In FIGS. 22 and 23, cable 37 is attached to linear measuring transducer rod 9A by clamp 37A. Clamp 10 secures the body of linear measuring transducer 9 to central support 1 by virtue of screws 55C. In addition, the right hand end of clamp 10 provides constraint with clamp 37A to spring 39. Cable anchor 37B is secured to central support 1 by screw 55B, thus the cable is always kept in tension due to spring 39. Cable 37 passes under rollers 11 which are retained to carriage block 3 by pins 61 about which they can rotate. Cable 37 also passes over roller 11A which is retained to pecker 4 by pin 60 about which it can rotate. As pecker 4 is free to rotate about pin 57, tension in cable 37 causes pecker to swing out from carriage block 3 if cable 40 is extended. If cable 40 is retracted, such that depth measuring probe 40A contacts the tip of pecker 4, then the torque on pecker 4 produced by spring 39 will be overcome and pecker 4 will retract into carriage block 3. This is shown more clearly in FIGS. 24 to 27. As spring 39 is compressed, linear measuring transducer rod 9A moves relative to linear measuring transducer body 9B producing a position measurement signal to control electronics 51A.

Figure 25:
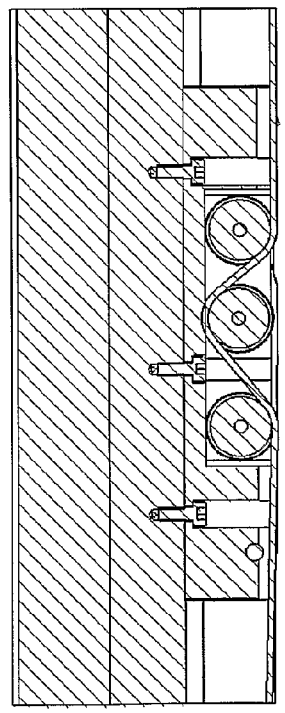

It can be seen that linear translation of cable drive tube 8 as controlled by motor encoder assembly 17A controls the angular displacement of pecker 4 whilst depth measuring probe tip 40A is in contact with pecker 4. If the depth measuring probe tip 40A hits a section of the wall lining where there is no perforation, then pecker 4 will not rotate fully and the position reached can be determined by linear measurement transducer 9. This is shown in FIG. 25.

Figure 26:
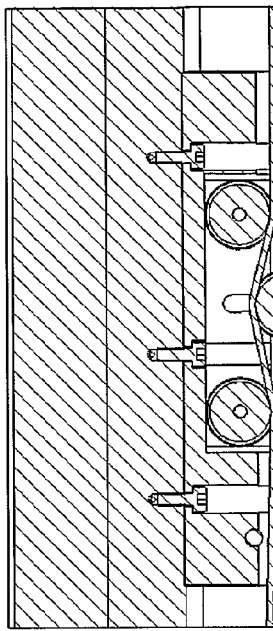

If the depth measuring probe tip 40A hits a section of the wall lining where there is a perforation, then pecker 4 will rotate fully and the cable will be deployed into the perforation. If the perforation is sufficiently deep, then the cable will be extended to full depth as determined by the aperture length of the cut-out in cable drive outer tube 5. Pecker 4 will remain at its angular displacement limit. This is shown in FIG. 26.

Figure 27:
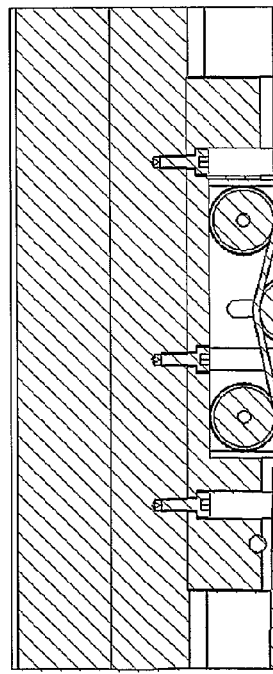

If the depth of the perforation is limited, then the cable will be deployed into the perforation until depth measurement probe tip reaches an obstruction. At this point further cable extension will result in a back thrust on pecker 4 causing it to retract into carriage block 3. This can be detected by linear measurement transducer 9, and by an increase in motor torque from motor encoder assembly 17A. Retracting cable 40 and re-extending it will confirm that an obstruction has been reached or will result in the obstruction being dislodged. Retraction of pecker 4 as a result of an obstruction being reached is shown in FIG. 27. Knowing the linear position of the carriage as measured by the encoder in motor encoder assembly 17B and the linear position of the cable as measured by the encoder in motor/encoder assembly 17A will enable the depth of the perforation to be determined.

The three pecker/cable states are shown in FIGS. 28 to 33.

It can be seen that this invention has means to clamp itself to a well lining, rotate and translate a pecking tool to locate perforations and means to deploy a depth measurement probe to determine perforation depth.

A further modification to this invention would be to add a rotational motor at the junction between cable drive tube 8 and cable clamp 57 to allow the cable to be rotated about its axis as a means to assist debris removal. In these circumstances, the depth measurement probe tip 40A may have cutting edges to improve debris removal.

It will of course be understood that many variations may be made to the above-described embodiment without departing from the scope of the present invention.

Although the present invention has been described with reference to preferred embodiments, workers skilled in the art will recognize that changes may be made in form and detail without departing from the spirit and scope of the invention.

The invention claimed is:

1. A downhole tool comprising an elongate housing having a longitudinal axis for insertion into a downhole environment, in which a probe sized to fit within a perforation is stored axially within the housing and extends radially therefrom by a variable amount, further comprising means for driving the probe in a radial direction, and means for sensing resistance to outward radial movement of the probe.

2. The downhole tool according to claim 1 in which the probe extends from an axially rotatable element.

3. The downhole tool according to claim 1 in which the probe is moveable axially along the tool.

4. The downhole tool according to claim 1 in which an end of the probe is supported on a probe carriage that is moveable longitudinally within the housing.

5. The downhole tool according to claim 4 in which the probe carriage is moved longitudinally by means of a lead screw.

6. The downhole tool according to claim 4 in which the probe extends through a probe guide which is shaped to bend the probe from a longitudinal direction within the housing to a radial direction external to the housing.

7. The downhole tool according to claim 6 in which the probe guide is moveable longitudinally within the housing.

8. The downhole tool according to claim 7 in which the probe guide is moved longitudinally by means of a lead screw.

9. The downhole tool according to claim 6 in which the probe guide is biased radially outwardly relative to the housing, and the tool comprises means for sensing movement of the guide against that bias.

10. The downhole tool according to claim 1 in which the probe is rotatable about the radial axis along which it extends.

11. The downhole tool according to claim 1 in which the probe is flexible to allow the probe to bend between a longitudinal and a radial disposition.

12. The downhole tool according to claim 2 in which the rotatable element is a central section of the housing.

13. The downhole tool according to claim 1 further comprising at least one radially extendable clamp for fixing the tool within a surrounding bore.

14. The downhole tool according to claim 13 in which at least one radially extendable clamp is provided at an upper end of the tool.

15. The downhole tool according to claim 13 in which at least one radially extendable clamp is provided at a lower end of the tool.

16. The downhole tool according to claim 13 in which the at least one radially extendable clamp is moved between an extended and a retracted position by interengagement with a member moveable relative to a remainder of the tool in a direction that is longitudinal relative to the tool, thereby to extend and/or retract the clamp.

17. The downhole tool according to claim 16 in which the member is a sleeve extending longitudinally around the tool, the sleeve being moveable longitudinally along the tool.

18. A method of investigating a downhole bore, comprising the steps of
   providing a tool according to any one of the preceding claims,
   locating the tool within the bore,
   driving the probe in a helical manner,
   whilst doing so, periodically extending the probe thereby to locate perforations in a wall of the bore.

19. The method according to claim 18 further comprising the step of, after locating a perforation, extending the probe into the perforation to ascertain the depth thereof.

* * * * *